United States Patent Office 3,783,098
Patented Jan. 1, 1974

3,783,098
HIGHLY POTENT, VIABLE AND STABLE CELL-FREE VIRUS PREPARATIONS FROM CELLS INFECTED WITH CELL-ASSOCIATED VIRUSES AND METHOD FOR OBTAINING THE SAME
Bruce W. Calnek and Stephen B. Hitchner, Ithaca, N.Y., assignors to Cornell Research Foundation Inc., Ithaca, N.Y.
No Drawing. Continuation-in-part of abandoned application Ser. No. 92,920, Nov. 25, 1970. This application Aug. 10, 1971, Ser. No. 170,616
Int. Cl. C12k 1/08, 7/00
U.S. Cl. 195—1.1
29 Claims

ABSTRACT OF THE DISCLOSURE

Viable, stable, cell-free virus suspensions having a high titer are obtained from cells infected with cell-associated virus by extracting the virus in the presence of a stabilizing agent. The viruses so produced may be lyophilized to form a viable storage-stable virus useful as a vaccine.

---

This application is a continuation-in-part of our copending application Ser. No. 92,920, filed Nov. 25, 1970 now abandoned.

The present invention relates to a novel method for obtaining viable, stable, cell-free viruses from cells infected with cell-associated viruses and the products produced therefrom. More particularly, the invention relates to a method for extracting cell-associated viruses from cells infected with these viruses while maintaining the viruses in a viable state. The cell-associated virus compositions obtained by the process of the invention are stable and possess their potency even following lyophilization. Thus, the virus compositions of the present invention may be stored under refrigerator temperatures for long periods of time and can be shipped to various locations without the expense of cumbersome refrigeration. In light of the stability of the virus compositions of this invention, it is possible to produce viable and infectious cell-associated viruses which can be used as a research tool that can be shipped conveniently to great distances and stored for long periods of time under refrigerator temperatures. It is also possible, following the practice of the present invention to extract cell-associated viruses from cells wherein the virus has been either attenuated or from a low virulence strain which is antigenically related to a particular disease. The cell-free viruses so obtained may be used in the preparation of vaccines in the prevention of diseases.

Many of the cell-associated viruses have been the subject of intensive investigation recently because of their apparent causal link to avian leukosis. In a recent publication, Witter et al., Avian Dis. 13:171–184 (1969), the herpes-type virus was cited as an etiological agent of Marek's disease, which is a contagious disease of chickens characterized by the presence of lymphoid tumors in various organs. Marek's disease is of great economic importance throughout the world since it is very contagious and has in some instances resulted in flock mortality of 50 percent or greater and a high percentage of condemnation in birds slaughtered for meat.

Because of the importance of finding a means for controlling Marek's disease, it has been necessary to be able to locate the particular causal agent of the disease, then isolate this material and subject it to controlled tests in an effort to develop a more comprehensive understanding of the causative agent of the disease. Unfortunately, prior attempts to remove and isolate the virus from cells infected with Marek's disease resulted in a complete loss of infectivity of the virus. Heretofore, the apparent necessity of the cell-associated viruses to remain intact within the cells in order to retain their viability and potency has prevented investigations in isolating the viruses for detailed examination or in obtaining a vaccine which can be lyophilized and stored in a cell-free state.

It is therefore an object of the invention to provide cell-associated virus suspensions which are cell-free and have increased stability and potency especially during lyophilization or when held in storage or in process for prolonged periods.

It is still another object to provide a stabilized vaccines.

A still further object is to provide means for stabilizing cell-associated viruses when extracted from infected cells.

These and other objects, features and advantages, which will be apparent from the following description of the invention, are realized by admixing cells infected with a cell-associated virus with a stabilizing agent for said virus and subjecting the infected cells to a disruption sufficient to rupture the cells, causing a release of the intact viable virus from the cells. The resulting suspension contains a viable and stable cell-associated virus which maintains its potency over prolonged periods. Since cell-associated viruses ordinarily lose their viability and potency when separated from their cells, it is surprising that the products of the invention which are cell-free, are far more viable and potent than materials which do not contain the stabilizing agent and are extracted from the cell. Another unexpected advantage is that whereas it is generally necessary to freeze many types of cell-associated viruses and maintain them at extremely low temperatures in order to achieve maximum stability during storage, the virus products of the invention can be kept while frozen at significantly higher temperatures for long periods without substantial loss of viability or potency. Also, the lyophilized products of the invention can be stored at refrigerator temperatures for long periods of time without substantial loss of viability or potency.

The invention applies broadly to cell-associated viruses and especially includes virus materials, in dry or aqueous form, which either are infective or can be used for the production of vaccines by previous attenuation of the virus by known techniques or by use of a virus which is antigenically related to a specific disease. For example, it is known that live attenuated virus of the herpes-type virus of Marek's disease, i.e., the HPRS-16 strain can be used to immunize against Marek's disease, as shown by Churchill et al., J. Gen. Virol 4:557–564 (1969) and Nature 221: 744–747 (1969). Also, it is known that vaccination with the FC–126 strain of turkey herpesvirus will provide protection against Marek's disease.

Thus, the invention is applicable to cell-associated viruses broadly including live virulent viruses, live attenuated viruses, live viruses antigenically related to Marek's disease and killed viruses. By way of illustration, some of the many cell-associated viruses to which the invention applies are the Group B herpesviruses such as those described by Melnick, J. Immunol. 92: 595–601 (1964), the disclosure of which is incorporated herein by reference. Some of the preferred cell-associated viruses applicable to the invention are varicella herpes zoster virus, cytomegalovirus, Burkitt lymphoma virus, Lucké tumor virus, turkey-herpes virus and Marek's disease virus. In the specification which follows the invention will be described for purposes of illustration with particular emphasis on cell-free preparation of cell-associated viruses and the production thereof, but it will be realized that the invention contemplates stabilized cell-free preparations of cell-associated viruses generally, including attenuated viruses and antigenically related viruses useful as vaccines.

The stabilizing agents to which the invention applies broadly, include any substance or combination of substances having a protective effect on the virus. This protective effect is, at least in part, of a character such that the stabilizing agent maintains a high titer of the virus during and/or after the disruption of the cells. Materials useful for this purpose are protein-containing materials, such as albumin or casein. The composition composed of the cell-free virus and these stabilizing agents are, preferably, used in conjunction with a starch-containing material, particularly in the event the compositions are to be lyophilized. The composition may also contain other adjuvants such as buffer agents. Bovine serum has been found to be a useful and economically feasible source of albumin, and, skim milk provides a convenient source for casein. Of course, other sources of protein-containing materials may be employed as a stabiliizng agent.

The proportion of protein-containing stabilizing agent to be dispersed with the infected cells for stabilizing purposes is subject to variation depending on the density of the cellular material, the relative conecntration of the virus present and other similar factors. Conveniently, the stabilizing agent, in the form of dry powder or dilute aqueous solution, is added to the cellular material, with thorough mixing at low temperatures to obtain a homogenous suspension of the cellular material in the stabilizing agent.

In general, the infected cellular material is suspended in an aqueous solution having dissolved therein the protein-containing material in a concentration as low as about 0.1% (w./v.). The weight/volume basis being dry weight (grams) of protein-containing material to a liquid volume (milliliters) of the solution in which the cellular material is suspended. Lower levels of the stabilizing agent may be employed, such as 0.05% (w./v.) to provide a fluid homogenous suspension. Concentrations of about 1% (w./v.) of the protein-containing material are acceptable. The invention contemplates the use of higher concentrations, as long as the protein-containing material is substantially dissolved in aqeuous medium. It will be seen from the foregoing that the concentration of protein-containing material (w./v.) basis, is such that a homogenous suspension of the cellular material in the stabilizing agent is obtained.

In the practice of the present invention, it may be desired to adjust the concentration of cellular material for the purpose of achieving specific virus titers. However, as long as the concentration (w./v.) is substantially as set forth above, the protective effect of the protein-containing stabilizing agent is not materially modified.

If the cell-free virus preparation is to be lyophilized, it has been found that a starch derivative-containing compound or a mixture of starch derivative-containing compounds added to the fluid preparation prior to drying greatly preserves or maintains the potency of the dry, cell-free virus preparation. The starch derivative may be added separately to the cell-free preparation or prior to the cell-disruption procedure with the aforesaid stabilizing agent. Most any starch derivative may be employed in combination with the protein-containing material. For example, the starch hydrolysates, such as sucrose, dextran or glucose may be combined with the protein-containing material to preserve or maintain the potency of the dry, cell-free virus preparation particularly during the lyophilization of these preparations. The use of sucrose is the preferred starch derivative to be employed. In this combination, the concentration of starch derivative may be as low as about 2% (w./v.) (gms. of starch derivative, dry basis to ml. of aqueous solution), to maintain high titers of the cell-free preparation during lyophilization. The invention contemplates the use of high concentrations. The concentration of protein-containing material is not directly related to the concentration of the starch derivative in obtaining dry, cell-free virus preparations having high titers. Thus, for a homogenous suspension of a cell-free virus containing preparation, any homogenous suspending amount of stabilizing agent, and any amount of starch derivative as low as about 2%. (w./v.) or more will effectively preserve the potency of said preparations.

Optionally, the stabilizing agent may contain small amounts of added buffers in an amount sufficient to maintain a relatively optimum pH, e.g. 6.5–7.5, for the virus in the stabilizing agent. Accordingly, a useful stabilizing agent comprises a mixture of bovine albumin, sucrose and a buffer such as the alkali metal phosphates. The addition of alkali metal glutamates may also be employed, however, its use is not necessary to preserve the potency and the stabilizing effect upon the cell-free virus preparation.

Other mixtures as stabilizing agents found useful besides albumin or casein with sucrose include: albumin, sucrose and alkali metal glutamates; casein, N-Z amine (enzymatic digest of milk protein) and glucose; bovine albumin, sucrose, alkali metal phosphates and alkali metal glutamates; and N-Z amine, sucrose, alkali metal phosphates and alkali metal glutamates. A preferred stabilizing agent useful in the practice of the invention is a mixture generally known as "SPGA," a stabilizing agent described by Bovarnick et al., J. Bact. 59: 509–522 (1950), which contains 7.46 gms. sucrose, 0.05 gm. monopotassium phosphate, 0.16 gm. dipotassium phosphate, 0.01 gm. monosodium glutamate and 1.0 gm. bovine albumin powder, respectively all dissolved in 100 ml. of distilled water. Excellent results have been obtained using a concentration of about 10 parts by weight of the foregoing "SPGA" stabilizing agent for each part of cellular material. Concentrations as high as about 150 parts by weight of the "SPGA" stabilizing agent have produced satisfactory results also. It is apparent that the respective concentrations of the protein-containing material and starch derivative of "SPGA" fall within the ranges set forth hereinabove.

The invention also contemplates highly potent, dry, stabilized products which are suitably prepared from the abovementioned fluid products by conventional drying procedures known in the art, such as freeze-drying or lyophilization. Thus, the invention as indicated contemplates not only fluid, aqueous cell-free virus preparations and vaccines, but also dry, non-aqueous products such as may be prepared by drying the abovementioned fluid preparations.

In accordance with conventional practice, the products of the invention are desirably processed under aspectic conditions using components which preliminarily have been rendered bacterially sterile.

The invention is illustrated but not limited by the following examples. The concentration of the ingredients is given in weight per volume percentage, unless otherwise specified.

VIRUS STRAINS

For the purpose of illustrating the invention, three strongly cell-associated herpesvirus strains were employed. These virus strains have been identified as turkey herpesvirus strain FC-126, the JM strain of Marek's disease and the GA strain of Marek's disease.

(a) The JM strain virus of Marek's disease is strongly cell-associated and antigenically related to herpesvirus of turkeys, but distinct from infectious laryngotracheitis and duck virus enteritis viruses. This virus has been designated as JM strain and has been deposited on a non-restrictive basis in the American Type Culture Collection, Washington, D.C. and added to its permanent collection of viruses of A.T.C.C. VR No. 585. It has also been deposited in the Cornell University repository and added to its collection, wherein it is available under Accession No. RT–711. A detailed description of the preparation and the characteristics of the JM strain in described by Sevoian et al., Vet. Med. 57:500–501 (1962), the disclosure of which is incorporated herein by reference.

(b) The turkey herpesvirus strain FC-126 is strongly cell-associated and antigenically related to Marek's disease virus of chickens. It has been described as being protective against Marek's disease when it is inoculated in one (1) day old chicks and subsequently challenged with Marek's disease virus. The herpesvirus has been designated as FC–126 (HVT) and it has been deposited on a non-restrictive basis in the American Type Culture Collection, Washington, D.C., and added to its permanent collection of viruses as A.T.C.C. VR No. 584. It has also been deposited in the Cornell University repository and added to its collection, wherein it is available under Accession No. RT–720. A more detailed description of the strain is described by Witter et al., Am. J. Vet. Res. 31: 525–538 (1970) and Okazaki et al., Avian Dis., 14: 413–429 (1970), the disclosures of which are incorporated herein by reference.

(c) The GA strain virus of Marek's disease is also strongly cell-associated. This virus has been designated as GA strain and has been deposited on a non-restrictive basis in the American Type Culture Collection, Washington, D.C., and added to its permanent collection of viruses as A.T.C.C. VR No. 624. It has also been deposited in the Cornell University repository and added to its collection, wherein it is available under Accession No. RT–743. A detailed description of the GA strain and its preparation is found in Eidson et al., Avian Dis., 12:467–475 (1968), the disclosure of which is incorporated herein by reference.

EXAMPLE 1

For trials 1–3 described below, the JM strain virus as set forth above was employed. The virus strain was obtained from 2 batches of skin from freshly killed chickens infected with the JM strain of Marek's disease virus by the following procedure. Strips of skin from which the feathers were clipped off at the surface were mixed 1:5 or 1:10 (w./v.) with phosphate buffered saline, pH 6.8, minced, homogenized for 5 minutes (Sorvall Omni-Mixer, Ivan Sorvall, Inc., Norwalk, Conn.), and sonicated for 2 minutes at a power setting of 7 (26–32 ma) with a Model W 140 D Sonifer Cell Disrupter (Heat Systems-Ultrasonics, Inc., Plainview, Long Island, N.Y.). The suspensions were clarified by centrifugation at 650×G and the supernates frozen at −65° C. They were considered free of viable cells. In trials 1–3 the virus suspensions were thawed and then, after the various described treatments, refrozen or lyophilized in 1- or 2-ml. quantities.

For trials 4–8, the procedure differed somewhat. Heavily infected (more than 75% CPE) 50 mm. Petri dish cultures were sources for JM, GA and FC–126 viruses. Both of the Marek's disease virus strains were grown in chicken kidney culture. In batches 643 and 659 the turkey herpesvirus was grown in chicken kidney cells. In batch 654 the turkey herpesvirus was grown in chicken embryo fibroblasts. The supernatant fluid was discarded and replaced with 2 ml. (Trial 6), 2.5 ml. (Trials 4, 5, 7) or 5 ml. (Trial 8) per culture of one of 2 suspending media. Cells were scraped free with a rubber policeman and the harvests from 4 or 5 cultures pooled (1 culture per treatment in Trial 8). Each suspension was sonicated for 2 minutes and 1-ml. aliquots frozen at −65° C. or lyophilized.

Cells from other cultures were harvested and frozen at −65° C. with procedures designed to preserve whole cells and with dimethyl sulfoxide as a protectant in the method described by Spencer et al., Avian Dis. 11: 274–287 (1967).

For Trials 9 and 10, a suspension of HVT-infected chicken embryo fibroblasts, frozen as whole live cells at −196° C., were thawed and diluted 1:30 (Trial 9) or 1:40 (Trial 10) in various suspending fluids (see Table 3). Five ml. portions were sonicated for 1 minute and 1 ml. aliquots frozen at −65° C. or lyophilized.

Stabilizers and diluents

In the first trial, the following solutions were employed:

(1) 20% glucose;

(2) skim milk stabilizer consisting of 8% nonfat dry milk and 2% N–Z amine, type AS (Sheffield Chemical, Norwich, N.Y.) in pH 6.2 Sorensen's buffer plus 5% glucose;
(3) "SPGA," a stabilizer described by Bovarnick et al., J. Bact. 59:509–522 (1950), the disclosure of which is incorporated herein by reference. The mixture contained 0.218 M sucrose, 0.0038 M monopotassium phosphate, 0.0072 M dipotassium phosphate, 0.0049 M monosodium glutamate, and 1% bovine albumin powder;
(4) "SPG-N-Z amine," the same formulation as SPGA except that the bovine albumin was replaced by 1% N–Z amine, Type B (a pancreatic digest of casein).

The pH of the various solutions varied from about 6.2 to 7.0, a range known to have no appreciable effect on virus titer. Additional tests with SPGA stabilizer were conducted in the second and third trials.

Two solutions were employed in Trials 4–8: phosphate buffered saline (PBS) pH 6.8; and SPGA.

For Trials 9 and 10 the following were prepared in phosphate buffer (0.0038 M monopotassium phosphate 0.0072 M dipotassium phosphate):

(a) 0.218 M sucrose (S)
(b) 0.0049 monosodium glutamate (G)
(c) S and G
(d) 1% bovine albumin powder (A)
(e) A and S
(f) A and G
(g) A, G, S
(h) 8% nonfat dry milk, 2% N–Z amine, type AS
(i) 8% nonfat dry milk also employed were the following:

(a) undiluted bovine fetal serum (BFS)
(b) 15% BFS in tissue culture medium #199 (M199)
(c) 10% dimethyl sulfoxide and 10% tryptose phosphate broth in M199.

In all trials, lyophilized samples were reconstituted with distilled water.

Lyophilization

Lyophilization was carried out in a Virtis Model USM-15 Freeze-Dryer (Virtis Co., Inc., Gardiner, N.Y.). Samples, in 5-ml. serum bottles with split rubber stoppers, were prefrozen at −65° C. in a separate mechanical freezer or frozen at −60° C. on the refrigerated shelves of the freeze-dryer. After drying under vacuum at 38° C. for 24 hours with heat applied to the drying shelves, an additional drying period of about 15 hours was carried out with the shelf temperature at 21° C. The bottles were sealed under vacuum and stored at 4° C. until virus assays were conducted. Assays were done from 1 to 10 days after the viruses had been processed.

Virus assays

In all trials, each sample was inoculated onto two drained, 24-hour chicken kidney cultures immediately after thawing or reconstitution. In the case of the Marek's disease viruses extracted from infected cell cultures 0.2% ethylene diamine tetraacetic acid (EDTA) was sometimes added to enhance the assay sensitivity. To assure an infection rate which permitted enumeration of individual foci, ten-fold dilutions also were inoculated in some cases. The diluent was the same as the suspending medium. Cell culture methods for assay were conducted in accordance with the method of Calnek et al., J. Nat. Cancer Instit. 45: 341–351, (1970). Focal lesions were enumerated at 8 days postinoculation (Marek's disease virus) or 6 days (turkey herpesvirus). The average of the focus counts from two replicate cultures and the dilution factor were used to estimate the number of focus forming units (FFU) per ml. of undiluted virus.

Results

The results are detailed in Tables 1, 2 and 3. The studies with the JM isolate of Marek's disease virus from skin extracts (Table 1) indicated the following: (1) virus survival following lyophilization was slightly enhanced by the use of 20% glucose as a stabilizer and markedly improved by SPGA or SPG-N-Z amine; 2) SPGA added to nonlyophilized virus suspensions increased titers more than 2-fold; 3) the highest titers were obtained from samples lyophilized with SPGA.

From the trials with cell culture-derived virus (Table 2), it is readily apparent that (1) both strains of Marek's disease virus were extracted to a higher titer with SPGA than with PBS as the suspending medium; (2) again, lyophilization was successful with SPGA stabilizer for Marek's disease virus; (3) the yields from extracted turkey herpesvirus-infected cultures were very much higher than those from Marek's disease virus-infected cultures although the titers of cell-associated infectivity were similar; (4) titers of PBS-extracted turkey herpesvirus were similar to those wherein cell culture medium for extraction was employed as described by Witter et al., Am. J. Vet. Res. 31: 525–538 (1970). SPGA extract titers were often 30–50 times those of the PBS extracts and the percent survival following lyophilization usually was 30–40% or more versus less than 1% for the respective extracts.

Reassays of virus dyophilized for Trials 2, 4, 6 and 7 were done after storage periods of 17 to 44 days at 4° C. Virus titers were unchanged from those in the original assays.

From Trials 9 and 10 (Table 3) it was learned that albumin alone or with sucrose and/or glutamate served as a suitable stabilizer for extracting virus but the addition of sucrose was advantageous for increasing the rate of survival during lyophilization. Also non-fat dry milk alone or in combination with N-Z amine was a suitable stabilizer for extraction and virus could be lyophilized. Other substances appeared to partially stabilize during extraction (e.g., bovine fetal serum, 10% BFS in M199, or 10% dimethyl sulfoxide 10% tryptose phosphates broth in M199) but were inferior to the above materials or combinations.

TABLE 1

[The effects of various treatments and stabilizers on the titer of cell-free JM strain Marek's disease Herpesvirus extracted from skin] [1]

| Trial | Virus batch | Treatment diluent and dilution | FFU/ml. undiluted virus Non-lyophil. | Lyophilized reconstit. water |
|---|---|---|---|---|
| 1 | X-300 | None | 2,800 | 100 |
|  |  | 20% glucose; 1:2 | 1,680 | 690 |
|  |  | Skim milk, 5% glucose; 1:5 | 2,400 | 360 |
|  |  | SPGA; 1:5 | 5,600 | 4,000 |
|  |  | SPG-N-Z amine; 1:5 | 4,800 | 3,120 |
| 2 | X-311 | None | 690 | <10 |
|  |  | SPGA; 1:5 | 1,330 | 480 |
| 3 | X-300 | None | 2,160 | — |
|  |  | PBS; 1:10 | 2,880 | — |
|  |  | SPGA; 1:10 | 4,000 | — |

[1] Abbreviations: FFU, focus forming units; PBS, phosphate buffered saline (pH 6.8); SPGA and SPG-N-Z amine, stabilizers (see text); —, not tested.

TABLE 2

[The effects of various treatments and stabilizers on the titer of cell-free preparations of Marek's Disease Herpesvirus (MDHV) (JM and GA strains) and strain FC 126 Turkey Herpesvirus (HVT) extracted from infected cell cultures] [1]

| Trial | Virus type and strain | Treatment | FFU/ml. diluent for extraction Whole cell suspension | PBS | SPGA |
|---|---|---|---|---|---|
| 4 | MDHV(JM) | Frozen | 58,000 | 120 | 220 |
|  |  | Lyophilized | — | [2] 0 | [2] 820 |
| 5 | MDHV(GA) | Frozen | 94,000 | 170 | — |
|  |  | Lyophilized | — | [2] 0 | [2] 3,850 |
| 6 | HVT(FC 126) | Frozen | 68,000 | 1,370 | 398,000 |
|  |  | Lyophilized | — | 0 | 125,000 |
| 7 | HVT(FC 126) | Frozen | 190,000 | 910 | 147,000 |
|  |  | Lyophilized | — | 5 | 72,000 |
| 8 | HVT(FC 126) | Frozen | 240 | 49,400 | 144,000 |
|  |  | Lyophilized | — | 0 | 96,000 |

[1] Abbreviations: PBS, phosphate buffered saline; SPGA, stabilizer; FFU, focus forming units; —, not done.
[2] Assay done with the addition of 0.2% EDTA added to the inoculum.

TABLE 3

[The effects of various materials in the suspending medium on the titer of cell-free preparations of strain FC 126 Turkey Herpesvirus (HVT) extracted from infected cell cultures] [1] [2]

| Suspending fluid | FFU/ml. diluent for extract Trial 9 Frozen | Lyophil | Trial 10 Frozen | Lyophil |
|---|---|---|---|---|
| Phosphate buffer alone | >10 | 0 | 0 | 0 |
| Materials in phosphate buffer: |  |  |  |  |
| Sucrose (0.218 M) | <10 | 0 | Not done |  |
| Glutamate (0.0049 M) | <10 | 0 | Not done |  |
| Scrose and glutamate | <10 | 0 | Not done |  |
| Bovine albumin (1%) | 3,500 | 25 | Not done |  |
| Bovine albumin and sucrose | 3,950 | 1,200 | Not done |  |
| Bovine albumin and glutamate | 1,925 | 75 | Not done |  |
| Bovine albumin, sucrose, and glutamate (SPGA formula) | 5,650 | 560 | 2,400 | 1,520 |
| Nonfat dry skim milk (8%) and N-Z amine (2%) | 2,760 | 85 | Not done |  |
| Nonfat dry skim milk (8%) | Not done |  | 840 | 110 |
| Miscellaneous materials: |  |  |  |  |
| Undiluted bovine fetal serum (BFS) | 100 | 0 | Not done |  |
| BFS (15%) in tissue culture med. 199 (M199) | 50 | 0 | Not done |  |
| Dimethyl sulfoxide (10%) and tryptose phosphate broth in M199 | 35 | 0 | Not done |  |

[1] Abbreviations: FFU, focus forming units; lyophil, lyophilized.
[2] The data in this table from experiments in which the donor cells (virus source) had been frozen as a whole cell suspension, with dimethyl sulfoxide as a protectant, then thawed, washed in buffer, and finally diluted 1:30 (Trial 9) or 1:40 (Trial 10) prior to extraction in the various fluids by sonication.

These results show that high yields of Marek's disease virus or turkey herpesvirus can be obtained by extraction in the presence of, or dilution in, a stabilizer for the virus and that lyophilization can be accomplished without appreciable loss of titer. Also, it can be seen from the foregoing data that the stable cell-free virus suspensions of the invention have titers of $10^3$ or greater in the case of Marek's disease viruses, and the titer of the suspensions of turkey herpesvirus is $10^5$ or greater. The results further reveal that extraction in the presence of bovine fetal serum, with or without tissue culture medium results in a virus of extremely low titer, indicating nearly a complete loss of effectiveness as a possible vaccine. Therefore, the present invention unexpectedly provides for a very efficient extraction of cell-associated virus from infected cells by the use of the proteins albumin or casein as well as materials containing albumin or casein, either of which may be used in combination with additives such as sucrose and the like.

This disruption and rupture of the cells, causing release of the intact viable virus from the cells, for the purpose of illustration in the example, was caused by sonication. However, it will be realized by those skilled in the art that other known techniques may be employed, such as, freeze-thawing, low temperature homogenization and the like. The only criteria of the extraction process of the invention is that the disruption and rupture of the cells must be conducted when the cells are dispersed in the stabilizing agent for the virus in order to obtain the cell-free virus in a viable state.

EXAMPLE 3

The potency (infectivity titer) of cell-free preparations from cells infected with turkey herpesvirus following sonic vibration in solutions containing various concentrations of bovine alubumin (serum fraction V) as the stabilizing agent was determined by the following procedure:

Primary cultures of chicken embryo fibroblast (CEF) cells were inoculated with FC–126 strain of turkey herpesvirus. After 3 days of incubation, the infected cells in 210 Petri dishes (60 mm.) were harvested by conventional trypsinization techniques, the yield was $1.4 \times 10^9$ cells. The packed volume of the cells following centrifugation at 1200 r.p.m. for 100 minutes was about 3 ml. The packed cells were resuspended with 60 ml. tissue culture medium (medium #199 plus 10% tryptose phosphate broth). Six aliquots of 10 ml. were placed in tubes and recentrifuged. The packed cell volume was about 0.5 ml. per tube. The supernatant was discarded and the infected cells were resuspended in 2.0 ml. of phosphate buffer containing varying amounts of albumin, to obtain a 1:5 (v./v.) dilution. Additional dilutions from those suspensions were made to effect 1:10, 1:100 ratios (v./v.) in the respective diluents.

Each sample was sonically vibrated for 45 seconds and then immediately diluted 1:10 (v./v.) in a stabilizing agent consisting of 6.7% sucrose, 1% bovine albumin in phosphate buffer, and frozen at −70° C.

For assay serial 10-fold dilutions were inoculated onto duplicate drained 24-hour primary cultures of CEF cells. Foci were counted at 5 days postinoculation.

TABLE 4

| | Focus forming units/ml. ($\times 10^6$) following sonication in the diluents containing the amount of albumin indicated | | | | |
|---|---|---|---|---|---|
| | 1% albumin | 0.5% albumin | 0.25% albumin | 0.1% albumin | 0.05% albumin |
| Ratio of cells to diluent (v./v.): | | | | | |
| 1:5 | 5.5 | 5.5 | 6.0 | 5.5 | 2.3 |
| | [1] (27.5) | (27.5) | (30.0) | (27.5) | (11.5) |
| 1:10 | 1.4 | 1.8 | 2.2 | 2.8 | 1.0 |
| | (14.4) | (18.0) | (21.6) | (27.6) | (9.6) |
| 1:100 | 0.17 | 0.24 | 0.26 | 0.28 | 0.14 |
| | (16.8) | (24.0) | (26.4) | (27.6) | (14.4) |
| Average yield per ml. packed cells (FFU$\times 10^6$) | 19.6 | 23.2 | 26.0 | 27.6 | 11.8 |

[1] Numbers in parentheses are the number of focus forming units ($\times 10^6$) per ml. of packed cells (number per ml. $\times$ the dilution factor).

It can be seen from the Table 4 that the ratio of cells to diluent was not a critical factor (yields corresponded to the number of virus cells present) and that levels of albumin as low as 0.1% (w./v.) were sufficient to provide a protective effect on the virus so as to maintain a high titer of the virus during and after the disruption procedure. Also, it can be seen that a concentration of 0.05% resulted in some protective effect, not as much as 0.1% to 1.0% (w./v.) concentrations.

EXAMPLE 3

The following procedure was performed to determine the survival of cell-free turkey herpesvirus extracted by sonic vibration of infected CEF cells suspended in one of the stabilizing agents of the invention (sucrose, phosphate buffer and bovine albumin) and then lyophilized after 1:10 dilution in solutions with various concentrations of sucrose and bovine albumin in phosphate buffer.

Primary cultures of CEF cells infected with turkey herpesvirus (FC–126 strain as prepared in Example 2) were diluted in a stabilizing agent consisting of 7.6% sucrose and 1% bovine albumin, serum fraction V in phosphate buffer (SPA) at a ratio (v./v.) of 1 part packed cells to 20 parts SPA stabilizing agent. The suspension was sonically vibrated for 1.5 minutes and then frozen overnight at −70° C. After thawing, the cell-free virus suspension was diluted 1:10 in each of 4 diluents: 10% sucrose, 10% sucrose, plus 1% albumin, 1% albumin (all in phosphate buffer) or in phosphate buffer alone. By mixing the appropriate amounts of virus diluted in 10% sucrose plus albumin with virus diluted in albumin alone, various concentrations of sucrose were achieved while maintaining the same concentration of albumin. Similar mixtures of virus in sucrose or in phosphate buffer were made. The latter all had a final concentration of 0.1% albumin as a result of the albumin in the virus employed to make the 1:10 dilution.

Each mixture was then lyophilized in 1-ml. aliquots.

For assay, each vial was reconstituted with 1 ml. distilled water and then 10-fold dilutions were made for inoculation onto duplicate 24-hr., drained primary cultures of CEF. The foci were enumerated at 5 days post-inoculation and the number of focus-forming units (FFU) per ml. calculated for each sample. The following results were obtained.

TABLE 5

| | FFU/ml. in sucrose solutions containing the amount of albumin indicated | |
|---|---|---|
| Final concentration of sucrose, percent | 1.0% albumin | 0.1% albumin |
| 10 | 44,400 | 43,200 |
| 8 | 36,000 | 35,200 |
| 6 | 45,600 | 56,000 |
| 4 | 31,200 | 44,800 |
| 2 | 35,200 | 33,600 |
| 1 | 14,000 | 13,600 |

These results show that sucrose concentrations as low as 2% by weight provide good protection of the cell-associated virus during lyophilization, whether the albumin concentration was 1.0% or 0.1% by weight.

EXAMPLE 4

The efficacy of lyophilized cell-free turkey herpesvirus (HVT) as a vaccine for the protection of chickens against Marek's disease was demonstrated by vaccinating one-day old and 3-week old susceptible chicks with graded doses of virus and challenging vaccinated and non-vaccinated chicks with virulent Marek's disease virus 20 or 22 days later. The results are shown in the table which follows.

It can be seen that doses as low as 2.7 and 6 focus-

TABLE 6

[Infection and resistance to challenge with virulent Marek's Disease virus in chicks vaccinated with lyophilized cell-free Turkey Herpesvirus (FC-126 strain)]

| Trial | Age at vacc. | Virus dilution | Dose (FFU) | Tests for infection[1] with HVT (pos./test.) | | Susceptibility to challenge[2] with Marek's disease virus (pos./chall.) | |
|---|---|---|---|---|---|---|---|
| | | | | Viremia | Precipitin | Viremic chicks | Non-viremic chicks |
| 1 | 1 day | 1:50 | 6,000 | 9/9 | 0/10 | 0/10 | [3] — |
| | | 1:500 | 600 | 10/10 | 0/10 | 0/10 | — |
| | | 1:5,000 | 60 | 9/9 | 0/10 | 1/9 | — |
| | | 1:50,000 | 6 | 8/10 | 0/10 | 1/8 | 2/2 |
| | | | None | 0/10 | 0/10 | — | 9/9 |
| 2 | 3 weeks | 1:50 | 2,700 | 10/10 | 1/10 | 0/10 | — |
| | | 1/500 | 270 | 10/10 | 0/10 | 0/10 | — |
| | | 1:5,000 | 27 | 10/10 | 0/10 | 0/9 | — |
| | | 1:50,000 | 2.7 | 7/10 | 0/10 | 1/7 | 3/3 |
| | | | None | 0/10 | 0/10 | — | 8/10 |

[1] Tested at 20 days (Trial 1) or 22 days (Trial 2) postvaccination. Assays for HVT viremia were conducted with buffy coat cells which were fresh (Trial 1) or frozen with DMSO as a protectant (Trial 2).
[2] Each chick inoculated intraabdominally with 10,000 FFU of JM virus-infected cells. Chicks which died of MD or had gross MD lesions at 8 weeks postvaccination considered susceptible.
[3] —. no birds in that category.

forming-units were infectious for most of the vaccinated chicks, and higher doses infections for all of the chicks. Also, it can be seen that nearly all of infected chicks resisted a severe challenge with virulent Marek's disease virus while non-vaccinated controls nearly all succumbed to an identical challenge.

While in the foregoing description the detailed embodiments of the present invention have been set forth, it will be understood by those skilled in the art that considerable variation may be made in such detail without departing from the spirit of our invention.

We claim:

1. A viable, stable, cell-free virus suspension having been extracted from infected cells in the presence of a stabilizer, said suspension comprising:
   (a) A Group B herpesvirus, and
   (b) A stabilizer, which stabilizes the potency of said virus during said extraction, comprising a member selected from the group consisting of albumin and casein.

2. A virus suspension, as in claim 1, wherein said stabilizer contains, in addition, a member selected from the group consisting of sucrose, glucose and dextran.

3. A virus suspension, as in claim 1, wherein said stabilizer contains, in addition, sucrose.

4. A virus suspension, as in claim 1, wherein said stabilizer contains, in addition, glucose.

5. A virus suspension, as in claim 1, wherein said stabilizer consists essentially of a member selected from the group consisting of
   (a) albumin,
   (b) albumin and sucrose
   (c) albumin and alkali metal glutamates
   (d) albumin, sucrose and alkali metal glutamates
   (e) skim milk
   (f) skim milk and an amine, which is the enzymatic digest of milk protein
   (g) casein, and
   (h) casein and an amine, which is the enzymatic digest of milk protein.

6. A virus suspension, as in claim 2, which contains a buffer.

7. A viable, stable cell-free virus suspension, as in claim 1, having been extracted from infected cells in the presence of a stabilizer, said suspension comprising
   (a) A Group B herpesvirus selected from the group consisting of turkey herpesvirus and Marek's disease virus, and
   (b) A stabilizer, which stabilizes the potency of said virus during said extraction, comprising a member selected from the group consisting of albumin and casein.

8. A virus suspension, as in claim 7, wherein said stabilizer contains in addition a member selected from the group consisting of sucrose, glucose and dextran.

9. A virus suspension, as in claim 7, wherein said stabilizer contains in addition sucrose.

10. A virus suspension, as in claim 7, wherein said stabilizer contains in addition glucose.

11. A virus suspension, as in claim 7, wherein said stabilizer consists essentially of a member selected from the group consisting of
    (a) albumin
    (b) albumin and sucrose
    (c) albumin and alkali metal glutamates
    (d) albumin, sucrose and alkali metal glutamates
    (e) skim milk
    (f) skim milk and an amine, which is the enzymatic digest of milk protein
    (g) casein, and
    (h) casein and an amine, which is the enzymatic digest of milk protein.

12. A virus suspension, as in claim 11, which contains a buffer.

13. A virus suspension, as in claim 11, wherein the virus is the JM strain virus of Marek's disease A.T.C.C. VR No. 585.

14. A virus suspension, as in claim 11, wherein the virus is the GA strain of Marek's disease A.T.C.C. VR No. 624.

15. A virus suspension, as in claim 11, wherein the virus is the turkey herpesvirus strain FC-126.

16. A viable, stable, cell-free lyophilized virus composition, having been extracted from infected cells in the presence of a stabilizer and subsequently lyophilized, said lyophilized composition comprising:
    (a) A Group B herpesvirus, and
    (b) A stabilizer, which stabilizes the potency of said virus during said extraction and lyophilization comprising a member selected from the group consisting of albumin and casein.

17. A lyophilized virus composition, as in claim 16, wherein said stabilizer contains in addition a member selected from the group consisting of sucrose, glucose and dextran.

18. A lyophilized virus composition, as in claim 16, wherein said stabilizer contains, in addition, sucrose.

19. A lyophilized virus composition, as in claim 16, wherein said stabilizer consists essentially of a member selected from the group consisting of
    (a) albumin and sucrose
    (b) albumin, sucrose and alkali metal glutamate.

20. A lyophilized virus composition, as in claim 19, wherein composition contains a buffer.

21. A viable, stable, cell-free, lyophilized virus composition, as in claim 16, having been extracted from infected cells in the presence of a stabilizer and subsequently lyophilized, said lyophilized composition comprising:
(a) A Group B herpesvirus selected from the group consisting of turkey herpesvirus and Marek's disease virus
(b) A stabilizer, which stabilizes the potency of said virus during said extraction and lyophilization comprising (1) a member selected from the group consisting of albumin and casein and (2) a member selected from the group consisting of sucrose, glucose, and dextran.

22. A lyophilized composition, as in claim 21, where (b) (2) comprises sucrose.

23. A lyophilized composition, as in claim 21, wherein said stabilizer comprises a member selected from the group consisting of
(a) albumin and sucrose
(b) albumin, sucrose and alkali metal glutamate.

24. A lyophilized composition, as in claim 23, which contains a buffer.

25. A viable, stable, cell-free, lyophilized Group B herpesvirus virus composition, having been extracted from cells infected with a Group B herpesvirus in the presence of a stabilizer which stabilizes said virus during the extraction, comprising a member selected from the group consisting of albumin and casein, and which has been subsequently lyophilized in the presence of said stabilizer which contains, in addition, a member selected from the group consisting of sucrose, glucose, and dextran.

26. A lyophilized composition, as in claim 25, which contains sucrose.

27. In a method of preparing a potent, stable, cell-free Group B herpesvirus suspension, the step which comprises extracting said virus from cells infected with said virus in the presence of a stabilizer comprising a member selected from the group consisting of albumin and casein.

28. The method of claim 27 which includes the step of lyophilizing the cell-free virus suspension, and where the suspension when lyophilized contains, in addition, a member selected from the group consisting of sucrose, glucose and dextran.

29. The method of claim 28 wherein the suspension when lyophilized contains sucrose.

References Cited
UNITED STATES PATENTS

| | | | |
|---|---|---|---|
| 3,674,861 | 7/1972 | Churchill | 424—89 |
| 3,642,574 | 2/1972 | Okazaki et al. | 195—1.1 X |
| 3,422,188 | 1/1969 | Cabasso | 424—89 |
| 3,143,470 | 8/1964 | Wilner | 424—89 X |
| 3,014,843 | 12/1961 | Baker | 424—89 X |
| 3,156,620 | 11/1964 | Sharpless | 424—89 |
| 3,629,399 | 12/1971 | Mauler et al. | 424—89 |
| 3,415,926 | 12/1968 | Hays et al. | 424—89 |
| 2,908,614 | 10/1959 | Muggleton et al. | 424—89 X |
| 2,946,724 | 7/1960 | Valentine | 424—89 |

SHEP K. ROSE, Primary Examiner

U.S. Cl. X.R.

195—1.5, 1.7, 1.8; 424—89